(12) United States Patent
Jiang (10) Patent No.: US 12,345,577 B1
(45) Date of Patent: Jul. 1, 2025

(54) USER VISION PROTECTION SUPERVISION METHOD AND RELATED DEVICE

(71) Applicant: Tongji Hospital Affiliated with Tongji Medical College of Huazhong University of Science and Technology, Wuhan (CN)

(72) Inventor: Yan Jiang, Wuhan (CN)

(73) Assignee: Tongji Hospital Affiliated with Tongji Medical College of Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 19/000,823

(22) Filed: Dec. 24, 2024

(30) Foreign Application Priority Data

Dec. 28, 2023 (CN) .......................... 202311852225.5

(51) Int. Cl.
*A61B 5/00* (2006.01)
*A47B 13/08* (2006.01)
*G01L 1/00* (2006.01)
*G06V 40/16* (2022.01)

(52) U.S. Cl.
CPC .............. *G01L 1/005* (2013.01); *A47B 13/08* (2013.01); *G06V 40/167* (2022.01); *A47B 2220/0091* (2013.01)

(58) Field of Classification Search
CPC ..... G01L 1/005; A61B 5/1036; A61B 5/1038; A61B 5/0024
USPC ........................................................ 73/763
See application file for complete search history.

(56) References Cited

U.S. PATENT DOCUMENTS

| | | | | |
|---|---|---|---|---|
| 7,399,276 B1* | 7/2008 | Brown | ................... | G16H 40/67 128/920 |
| 7,598,881 B2* | 10/2009 | Morgan | ............ | B60R 21/01534 340/552 |
| 7,652,582 B2* | 1/2010 | Littell | ................... | A61B 5/103 600/920 |
| 7,771,318 B2* | 8/2010 | Narayanaswami | .... | A63B 24/00 482/148 |
| 8,219,184 B2* | 7/2012 | Stelzer | ................. | A61B 5/6888 600/509 |
| 9,044,172 B2* | 6/2015 | Baxi | ..................... | A61B 5/1116 |

(Continued)

FOREIGN PATENT DOCUMENTS

| | | |
|---|---|---|
| CN | 105615290 A | 6/2016 |
| CN | 112181186 A | 1/2021 |
| KR | 20160069699 A | 6/2016 |

*Primary Examiner* — Tran M. Tran
(74) *Attorney, Agent, or Firm* — Nitin Kaushik (57) ABSTRACT

The present invention discloses a user vision protection supervision method and a related device, relates to the field of device control, and mainly aims to solve the problems that at present, students lack related eye protection knowledge or lack self-consciousness when reading and writing and are difficult to keep good reading and writing habits, causing that the vision of the students is reduced quickly and is difficult to keep. The method includes: acquiring target user feature information; predicting specific pressure monitoring thresholds associated with different desk states of the user based on the target user feature information; acquiring desk pressure of the target user; and supervising desk behavior of the target user based on the desk pressure of the target user and the specific pressure monitoring threshold.

5 Claims, 3 Drawing Sheets

(56) References Cited

U.S. PATENT DOCUMENTS

| | | | |
|---|---|---|---|
| 10,058,285 B2* | 8/2018 | Horseman | A61B 5/743 |
| 11,064,911 B2* | 7/2021 | Panneer Selvam | A61B 5/1116 |
| 12,158,758 B2* | 12/2024 | Dean | G05D 1/81 |
| 12,213,191 B1* | 1/2025 | Sculley | A47C 31/12 |
| 2009/0319297 A1* | 12/2009 | Hernandez | G16H 50/30 |
| | | | 705/2 |
| 2009/0324024 A1* | 12/2009 | Worthington | G06V 40/161 |
| | | | 382/118 |
| 2013/0234826 A1* | 9/2013 | Sekiguchi | H04N 21/4223 |
| | | | 340/5.52 |

* cited by examiner

USER VISION PROTECTION SUPERVISION METHOD AND RELATED DEVICE

CROSS-REFERENCE TO RELATED APPLICATIONS

The application claims priority to Chinese patent application No. 2023118522255, filed on Dec. 28, 2023, the entire contents of which are incorporated herein by reference.

TECHNICAL FIELD

The present invention relates to the technical field of the intelligent monitoring, and in particular, to a user vision protection supervision method and a related device.

BACKGROUND

Prolonged bowing of the head or tilting of the body to read and write will make the distance between the eyes and the book is too close, aggravating the adjustment burden of the eyes, which may lead to myopia over time. Reading and writing in an ambient with weak light or too strong light requires the eyes to adapt to changes in light, which may lead to eye fatigue or even damage for a long time. Prolonged uninterrupted reading and writing not only increases eye fatigue, but also reduces the number of blinks and affects the normal secretion of tears which may cause xerophthalmia, and dry eyes are also a factor that leads to myopia. All of these bad eye-using habits may lead to myopia, but it is difficult to maintain a good eye-using habit only by self-consciousness.

SUMMARY

In view of the foregoing problem, the present invention provides a user vision protection supervision method and a related device, and mainly aims to solve the problems that at present, students lack related eye protection knowledge or lack self-consciousness when reading and writing and are difficult to keep good reading and writing habits, causing that the vision of the students is reduced quickly and is difficult to keep.

In order to solve at least one of the foregoing technical problems, according to a first aspect, the present invention provides a user vision protection supervision method, including:
  acquiring target user feature information;
  predicting specific pressure monitoring thresholds associated with different desk states of the user based on the target user feature information;
  acquiring desk pressure of the target user; and
  supervising desk behavior of the target user based on the desk pressure of the target user and the specific pressure monitoring threshold.

Optionally, the user feature includes at least one of gender, age, height, and weight, and the predicting specific pressure monitoring thresholds associated with different desk states of the user based on the target user feature information includes:
  calculating limb mass data of the user based on the target user feature information; and
  predicting a first pressure monitoring threshold of the user in a desk sleeping state based on the limb mass data, where
  the supervising desk behavior of the target user based on the desk pressure of the target user and the specific pressure monitoring threshold includes:
  when the desk pressure of the target user is greater than or equal to the first pressure monitoring threshold, predicting that the target user is in the desk sleeping state, and generating a user wake-up instruction.

Optionally, the predicting specific pressure monitoring thresholds associated with different desk states of the user based on the target user feature information includes:
  calculating limb mass data of the user based on the target user feature information; and
  predicting a second pressure monitoring threshold of the user in a desk read-write state based on the limb mass data, where
  the supervising desk behavior of the target user based on the desk pressure of the target user and the specific pressure monitoring threshold includes:
  when the desk pressure of the target user is less than the first pressure monitoring threshold and greater than or equal to the second pressure monitoring threshold, predicting that the target user is in the desk read-write state, and generating a read-write state monitoring instruction.

Optionally, the method further includes:
  monitoring at least one of a read-write posture, a read-write duration, and an ambient light brightness of the user based on the read-write state monitoring instruction;
  when the read-write posture does meet a preset posture, generating a posture correction prompt; and/or
  when the continuous read-write duration is greater than a preset duration, generating a read-write duration prompt; and/or
  when the ambient light brightness is less than a preset brightness, generating a fatigue eye-using prompt.

Optionally, based on the read-write state monitoring instruction is executed by a classroom centralized imaging device or is executed by an independent imaging device at a target user position, and when the read-write state monitoring instruction is executed by the classroom centralized imaging device, the method further includes:
  recognizing a plurality of users in a classroom through a facial recognition technology; and
  matching a recognition result with an identifier of an independent pressure monitoring device and/or a message prompt device at a pre-stored user position, so as to complete user vision protection supervision based on the cooperation with the independent pressure monitoring device and/or the message prompt device at the corresponding user position.

Optionally, the method further includes:
  acquiring a grayscale image of a force application surface obtained during pressure monitoring;
  when a grayscale gradient of the grayscale image of the force application surface indicates that there is an edge grayscale change exceeding a preset value, determining that the grayscale image of the force application surface is a non-user force application point; and
  excluding pressure data corresponding to the non-user force application point.

Optionally, the method further includes:
  acquiring a grayscale image of a force application surface obtained during pressure monitoring;
  when the grayscale image of the force application surface is a uniform grayscale image, determining that the grayscale image of the force application surface is a non-user force application point; and excluding pressure data corresponding to the non-user force application point.

According to a second aspect, an embodiment of the present invention further provides a user vision protection supervision apparatus, including a first acquisition unit, configured to acquire target user feature information;

a prediction unit, configured to predict specific pressure monitoring thresholds associated with different desk states of the user based on the target user feature information;

a second acquisition unit, configured to acquire desk pressure of the target user; and a supervision unit, configured to supervise desk behavior of the target user based on the desk pressure of the target user and the specific pressure monitoring threshold.

In order to achieve the above purpose, according to a third aspect of the present invention, a computer-readable storage medium is provided, and the above computer-readable storage medium includes a stored program, where when the program is executed by a processor, the user vision protection supervision method is implemented.

In order to achieve the above purpose, according to a fourth aspect of the present invention, an electronic device is provided, and the electronic device includes at least one processor and at least one memory connected to the processor, where the processor is configured to invoke program instructions in the memory to perform the above user vision protection supervision method.

By the above technical solutions, the present invention provides a user vision protection supervision method and a related device. The above method includes: acquiring target user feature information; predicting specific pressure monitoring thresholds associated with different desk states of the user based on the target user feature information; acquiring desk pressure of the target user; and supervising desk behavior of the target user based on the desk pressure of the target user and the specific pressure monitoring threshold. Therefore, the desk states of different users are not monitored based on the fixed pressure monitoring threshold, so as to avoid the problem that different users cannot accurately determine the desk state of the user due to the pressure monitoring threshold caused by their own somatotype difference. In addition, the user does not need to input or change the monitoring threshold by himself/herself, so as to avoid the problem that the user cannot accurately evaluate the desk state of the user based on the desk pressure because a reasonable pressure monitoring threshold cannot be accurately estimated based on their own somatotype condition. Furthermore, the specific pressure monitoring threshold value accurately evaluated based on the target user feature information can accurately evaluate the desk state of the user based on the collected desk pressure of the target user, and then a corresponding user desk behavior supervision logic is performed, so that the eye-using habit of the user is improved, and the occurrence or progress of myopia is avoided.

Accordingly, the user vision protection supervision apparatus, the electronic system, and the computer-readable storage medium provided by the embodiment of the present invention also have the above technical effects.

The above description is only an overview of the technical solutions of the present invention, and in order to understand the technical means of the present invention more clearly to implement them in accordance with the content of the specification, and to make the above-described and other objectives, features, and advantages of the present invention more obvious and understandable, the implementation manners of the present invention are illustrated below.

BRIEF DESCRIPTION OF THE DRAWINGS

Various other advantages and benefits will become apparent to those of ordinary skill in the art upon reading the following detailed description of the preferred embodiments. The accompanying drawings are only for the purpose of illustrating the preferred implementations and are not considered as limiting the present invention. Throughout the accompanying drawings, the same reference numerals represent the same components. In the drawings.

DETAILED DESCRIPTION OF THE EMBODIMENTS

The following describes exemplary embodiments of the present invention in more detail with reference to the accompanying drawings. Although the exemplary embodiments of the present invention are shown in the accompanying drawings, it should be understood that the present invention may be implemented in various forms and should not be limited by the embodiments set forth herein. On the contrary, the embodiments are provided to enable a more thorough understanding of the present invention and completely convey the scope of the present invention to a person skilled in the art.

Figure 1:
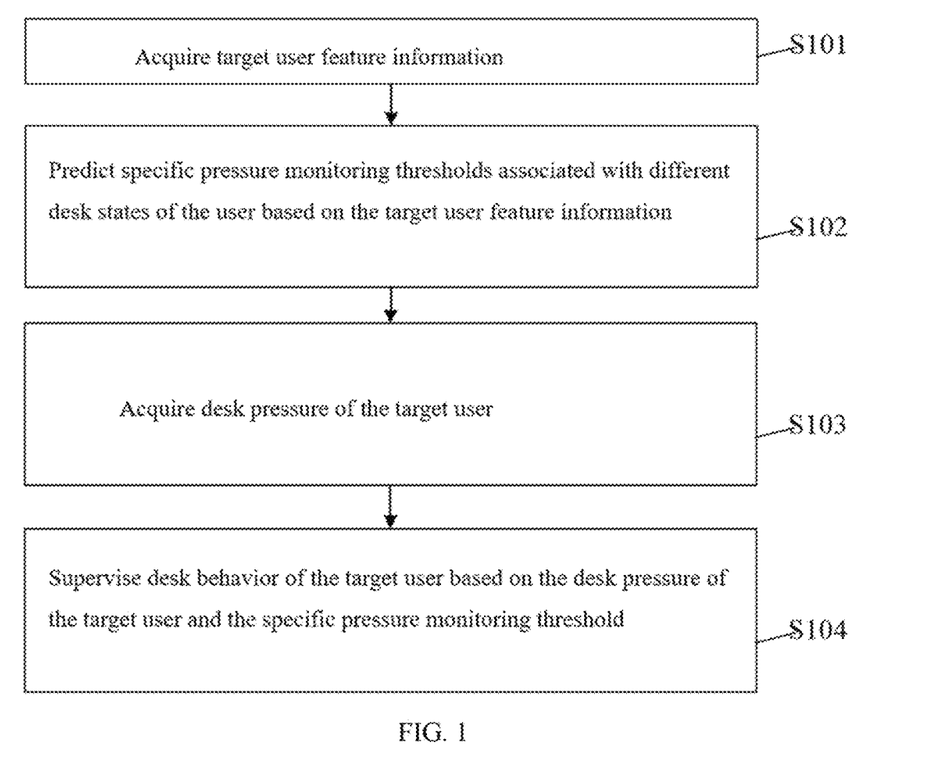
FIG. 1 is a schematic flowchart of a user vision protection supervision method according to an embodiment of the present invention.

In order to solve the problems that at present, students lack related eye protection knowledge or lack self-consciousness when reading and writing and are difficult to keep good reading and writing habits, causing that the vision of the students is reduced quickly and is difficult to keep. The embodiment of the present invention provides a user vision protection supervision method, as show in FIG. 1, and the method includes:

S101: Acquire target user feature information.

Exemplarily, the above user feature information can be information which can directly or indirectly reflect the somatotype or weight of the user, such as gender, height, weight, age and the like. This is not limited herein. These information can be pre-stored, and then can be acquired from the background by simply recognizing the user identity.

S102: Predict specific pressure monitoring thresholds associated with different desk states of the user based on the target user feature information.

Exemplarily, the stature, the somatotype, the weight and other information of the user can be predicted based on the above target user feature information, and then the weight of the limb part of the target user can be further predicted. It can be understood that the pressure range applied to a table top by different desk states of the user can be evaluated by predicting the weight of the limb part of the target user. For example, the pressure range applied to the table top when the target user is in a desk read-write state is speculated based on the weight of the two arms of the target user, and the pressure range applied to the table top when the target user is in a lying state is speculated based on the weight of the two arms and the head and neck of the target user. The above pressure monitoring can be acquired through a pressure sensor arranged on the table top. The pressure sensor can be uniformly distributed on the table top; the pressure sensor can also be distributed on the table top in the form of a table mat; and the pressure sensor can be arranged in the table mat interlayer and can also be arranged at the bottom of the table mat. This is not limited herein.

S103: Acquire desk pressure of the target user.

S104: Supervise desk behavior of the target user based on the desk pressure of the target user and the specific pressure monitoring threshold.

Exemplarily, the current desk behavior of the user can be inferred based on the desk pressure of the target user obtained by monitoring and the pressure thresholds of different desk states of the user speculated based on the target user feature information, and then the eyes of the user are supervised. The pressure monitoring data can be transmitted to a separate controller of each desk or desk mat through the pressure sensor in a wired or wireless manner, and may also be centralized in a general controller or even a remote server of a classroom or a room.

By the above technical solutions, the present invention provides a user vision protection supervision method, including: acquiring target user feature information; predicting specific pressure monitoring thresholds associated with different desk states of the user based on the target user feature information; acquiring desk pressure of the target user; and supervising desk behavior of the target user based on the desk pressure of the target user and the specific pressure monitoring threshold. Therefore, the desk states of different users are not monitored based on the fixed pressure monitoring threshold, so as to avoid the problem that different users cannot accurately determine the desk state of the user due to the pressure monitoring threshold caused by their own somatotype difference. In addition, the user does not need to input or change the monitoring threshold by himself/herself, so as to avoid the problem that the user cannot accurately evaluate the desk state of the user based on the desk pressure because a reasonable pressure monitoring threshold cannot be accurately estimated based on their own somatotype condition. Furthermore, the specific pressure monitoring threshold value accurately evaluated based on the target user feature information can accurately evaluate the desk state of the user based on the collected desk pressure of the target user, and then a corresponding user desk behavior supervision logic is performed, so that the eye-using habit of the user is improved, and the occurrence or progress of myopia is avoided.

In an embodiment, the user feature includes at least one of gender, age, height, and weight, and the predicting specific pressure monitoring thresholds associated with different desk states of the user based on the target user feature information includes:

calculating limb mass data of the user based on the target user feature information; and predicting a first pressure monitoring threshold of the user in a desk sleeping state based on the limb mass data, where the supervising desk behavior of the target user based on the desk pressure of the target user and the specific pressure monitoring threshold includes:

when the desk pressure of the target user is greater than or equal to the first pressure monitoring threshold, predicting that the target user is in the desk sleeping state, and generating a user wake-up instruction.

In an embodiment, the predicting specific pressure monitoring thresholds associated with different desk states of the user based on the target user feature information includes:

calculating limb mass data of the user based on the target user feature information; and predicting a second pressure monitoring threshold of the user in a desk read-write state based on the limb mass data, where the supervising desk behavior of the target user based on the desk pressure of the target user and the specific pressure monitoring threshold includes:

when the desk pressure of the target user is less than the first pressure monitoring threshold and greater than or equal to the second pressure monitoring threshold, predicting that the target user is in the desk read-write state, and generating a read-write state monitoring instruction.

Exemplarily, pressure monitoring is performed in the form of a table mat as an example, and an eye exercises broadcast function can also be arranged for the table mat. A voice device is arranged on the surface of the table mat, so that the user can do the eye exercises according to a voice prompt only by lightly pressing a button. Meanwhile, the surface of the table mat can be printed with an operation step of the eye exercises, so that the user can accurately do the eye exercises with reference to a table mat pattern under the voice prompt.

In an embodiment, the method further includes:

monitoring at least one of a read-write posture, a read-write duration, and an ambient light brightness of the user based on the read-write state monitoring instruction;

when the read-write posture does meet a preset posture, generating a posture correction prompt; and/or when the continuous read-write duration is greater than a preset duration, generating a read-write duration prompt; and/or when the ambient light brightness is less than a preset brightness, generating a fatigue eye-using prompt.

Exemplarily, aiming at the problem that the read-write posture of the user is not standard, distance monitoring can be performed by using an imaging device through image analysis or an infrared device. For example, when the eyes of user are smaller than 33 cm away from the table mat, and the chest is smaller than a punch (6-7 cm) away from the table, the device gives a buzzing prompt or a vibration prompt.

Exemplarily, pressure monitoring is performed in the form of a table mat as an example, and when the double-elbow desk time of the user is greater than 40 minutes, the intelligent table mat can give a prompt tone to prompt the user to pause the use of eyes.

In an embodiment, based on the read-write state monitoring instruction is executed by a classroom centralized imaging device or is executed by an independent imaging device at a target user position, and when the read-write state monitoring instruction is executed by the classroom centralized imaging device, the method further includes:

recognizing a plurality of users in a classroom through a facial recognition technology; and matching a recognition result with an identifier of an independent pressure monitoring device and/or a message prompt device at a pre-stored user position, so as to complete user vision protection supervision based on the cooperation with the independent pressure monitoring device and/or the message prompt device at the corresponding user position.

In an embodiment, the method further includes:

acquiring a grayscale image of a force application surface obtained during pressure monitoring;

when a grayscale gradient of the grayscale image of the force application surface indicates that there is an edge grayscale change exceeding a preset value, determining that the grayscale image of the force application surface is a non-user force application point; and excluding pressure data corresponding to the non-user force application point.

Exemplarily, it is difficult to ensure that the table top of the user does not have the pressure noise of other articles except the limb pressure of the user desk. An acquired grayscale image of the force application surface can be used, and the contact pressure of the limb of the user or the book and other articles can be determined by indicating the existence of the edge grayscale change condition through the grayscale gradient of the grayscale image of the force application surface. Generally, a grayscale change of the grayscale image of the force application face generated by the contact pressure of the limb of the user is relatively mild near an edge, and the situation that the edge grayscale suddenly changes greatly does not occur. Therefore, when a grayscale gradient of the grayscale image of the force application surface indicates that there is an edge grayscale change exceeding a preset value, for example, when the grayscale difference adjacent to an edge position is 80%, it is determined that the grayscale image of the force application surface is a non-user force application point, and the pressure data corresponding to the non-user force application point needs to be excluded, so as to ensure the accurate determination of the user desk behavior.

In an embodiment, the method further includes:

acquiring a grayscale image of a force application surface obtained during pressure monitoring;

when the grayscale image of the force application surface is a uniform grayscale image, determining that the grayscale image of the force application surface is a non-user force application point; and excluding pressure data corresponding to the non-user force application point.

Exemplarily, it is difficult to ensure that the table top of the user does not have the pressure noise of other articles except the limb pressure of the user desk. An acquired grayscale image of the force application surface can be used, and the contact pressure of the limb of the user or the book and other articles can be determined through the grayscale distribution condition of the grayscale image of the force application surface. Generally, the grayscale image of the force application face generated by the contact pressure of the limb of the user is not uniformly distributed, and is often gradually reduced from the center to the edge, however, the grayscale image of the force application surface generated by applying force to interfering articles such as books is often very uniform. When the grayscale image of the force application surface is a uniform grayscale image, it can be determined that the grayscale image of the force application surface is a non-user force application point, and the pressure data corresponding to the non-user force application point needs to be excluded, so as to ensure the accurate determination of the user desk behavior.

Exemplarily, a full-spectrum light source can be used to simulate a spectrum composition of natural light, so as to provide light closer to a natural environment. The full-spectrum light source can cover all frequency bands of visible light, rather than just focusing on a specific frequency band. The light intensity adjustment can also be performed, and the read-write state of the user can be automatically recognized, so as to adjust brightness. For example, when it is recognized that the user reads and writes the paper reading material, the brightness of the light source is higher than the brightness of the light source when the user reads and writes the electronic screen, thereby reducing eye fatigue. The light source can also be adjusted by a color temperature, for example, a lower color temperature may emit warmer (yellowish) light, and a higher color temperature may emit cooler (bluish) light. The adjustment of the color temperature helps to simulate the change of natural light from morning to evening, which is very important for maintaining the biological clock of the human body and improving visual comfort. The adjustment of the light sources can be dynamically compensated based on the change of ambient light, and when the user is in the same read-write state, the change of the ambient light and the possible damage to the eyes of the user are dynamically supplemented, so as to achieve the effect of protecting the eyes.

Figure 2:
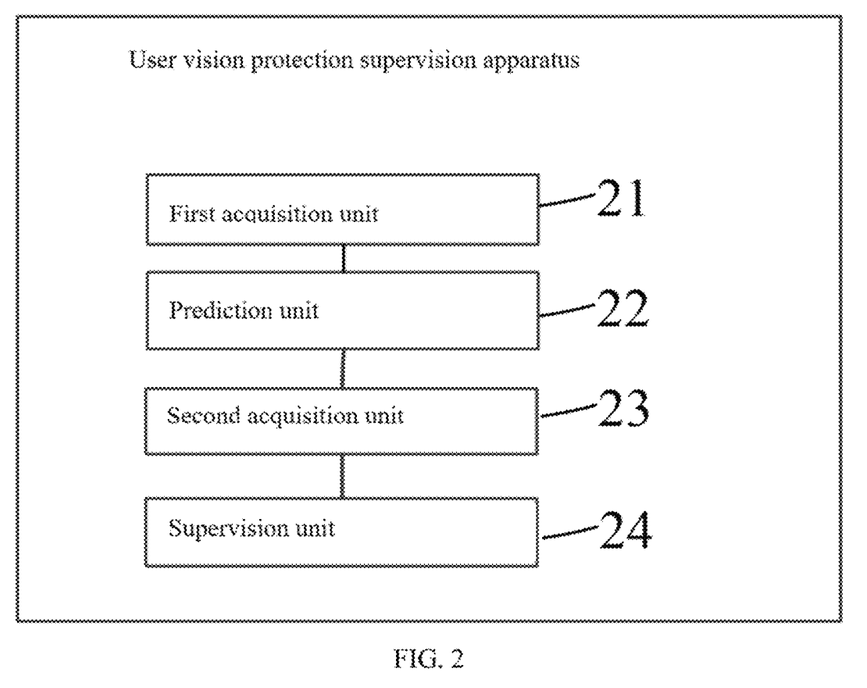
FIG. 2 is a schematic block diagram of constitution of a user vision protection supervision apparatus according to an embodiment of the present invention.

Further, as an implementation of the method shown in FIG. 1, the embodiment of the present invention further provides a user vision protection supervision apparatus, which is configured to implement the method shown in FIG. 1. The apparatus embodiment corresponds to the foregoing method embodiment. For ease of reading, details in the foregoing method embodiment are not described one by one in the apparatus embodiment. However, it should be clear that the apparatus in this embodiment can correspondingly implement all the contents in the foregoing method embodiment. As shown in FIG. 2, the apparatus includes a first acquisition unit 21, a prediction unit 22, a second acquisition unit 23, and a supervision unit 24, where the first acquisition unit is configured to acquire target user feature information;

the prediction unit is configured to predict specific pressure monitoring thresholds associated with different desk states of the user based on the target user feature information;

the second acquisition unit is configured to acquire desk pressure of the target user; and the supervision unit is configured to supervise desk behavior of the target user based on the desk pressure of the target user and the specific pressure monitoring threshold.

By the above technical solutions, the present invention provides a user vision protection supervision apparatus, including: acquiring target user feature information; predicting specific pressure monitoring thresholds associated with different desk states of the user based on the target user feature information; acquiring desk pressure of the target user; and supervising desk behavior of the target user based on the desk pressure of the target user and the specific pressure monitoring threshold. Therefore, the desk states of different users are not monitored based on the fixed pressure monitoring threshold, so as to avoid the problem that different users cannot accurately determine the desk state of the user due to the pressure monitoring threshold caused by their own somatotype difference.

In addition, the user does not need to input or change the monitoring threshold by himself/herself, so as to avoid the problem that the user cannot accurately evaluate the desk state of the user based on the desk pressure because a reasonable pressure monitoring threshold cannot be accurately estimated based on their own somatotype condition. Furthermore, the specific pressure monitoring threshold value accurately evaluated based on the target user feature information can accurately evaluate the desk state of the user based on the collected desk pressure of the target user, and then a corresponding user desk behavior supervision logic is performed, so that the eye-using habit of the user is improved, and the occurrence or progress of myopia is avoided.

The processor includes a kernel, and the kernel invokes a corresponding program unit from the memory. One or more cores can be arranged, and a user vision protection supervision method is achieved by adjusting kernel parameters, which can solve the problem that a better coordination device switching method is lacked on the basis of the Internet of Things level at present.

An embodiment of the present invention provides a computer-readable storage medium, and the above computer-readable storage medium includes a stored program, where when the program is executed by a processor, the above user vision protection supervision method is implemented.

An embodiment of the present invention provides a processor, and the processor is used for running a program, where when the program runs, the above user vision protection supervision method is implemented:
  acquiring target user feature information;
  predicting specific pressure monitoring thresholds associated with different desk states of the user based on the target user feature information;
  acquiring desk pressure of the target user; and
  supervising desk behavior of the target user based on the desk pressure of the target user and the specific pressure monitoring threshold.

Optionally, the user feature includes at least one of gender, age, height, and weight, and the predicting specific pressure monitoring thresholds associated with different desk states of the user based on the target user feature information includes:
  calculating limb mass data of the user based on the target user feature information; and
  predicting a first pressure monitoring threshold of the user in a desk sleeping state based on the limb mass data, where
  the supervising desk behavior of the target user based on the desk pressure of the target user and the specific pressure monitoring threshold includes:
  when the desk pressure of the target user is greater than or equal to the first pressure monitoring threshold, predicting that the target user is in the desk sleeping state, and generating a user wake-up instruction.

Optionally, the predicting specific pressure monitoring thresholds associated with different desk states of the user based on the target user feature information includes:
  calculating limb mass data of the user based on the target user feature information; and
  predicting a second pressure monitoring threshold of the user in a desk read-write state based on the limb mass data, where
  the supervising desk behavior of the target user based on the desk pressure of the target user and the specific pressure monitoring threshold includes:
  when the desk pressure of the target user is less than the first pressure monitoring threshold and greater than or equal to the second pressure monitoring threshold, predicting that the target user is in the desk read-write state, and generating a read-write state monitoring instruction.

Optionally, the method further includes:
  monitoring at least one of a read-write posture, a read-write duration, and an ambient light brightness of the user based on the read-write state monitoring instruction;
  when the read-write posture does meet a preset posture, generating a posture correction prompt; and/or
  when the continuous read-write duration is greater than a preset duration, generating a read-write duration prompt; and/or
  when the ambient light brightness is less than a preset brightness, generating a fatigue eye-using prompt.

Optionally, based on the read-write state monitoring instruction is executed by a classroom centralized imaging device or is executed by an independent imaging device at a target user position, and when the read-write state monitoring instruction is executed by the classroom centralized imaging device, the method further includes:
  recognizing a plurality of users in a classroom through a facial recognition technology; and
  matching a recognition result with an identifier of an independent pressure monitoring device and/or a message prompt device at a pre-stored user position, so as to complete user vision protection supervision based on the cooperation with the independent pressure monitoring device and/or the message prompt device at the corresponding user position.

Optionally, the method further includes:
  acquiring a grayscale image of a force application surface obtained during pressure monitoring;
  when a grayscale gradient of the grayscale image of the force application surface indicates that there is an edge grayscale change exceeding a preset value, determining that the grayscale image of the force application surface is a non-user force application point; and
  excluding pressure data corresponding to the non-user force application point.

Optionally, the method further includes:
  acquiring a grayscale image of a force application surface obtained during pressure monitoring;
  when the grayscale image of the force application surface is a uniform grayscale image, determining that the grayscale image of the force application surface is a non-user force application point; and
  excluding pressure data corresponding to the non-user force application point.

An embodiment of the present invention provides an electronic device, and the above electronic device includes at least one processor and at least one memory connected to the processor, where the processor is configured to invoke program instructions in the memory to perform the above user vision protection supervision method:
  acquiring target user feature information;
  predicting specific pressure monitoring thresholds associated with different desk states of the user based on the target user feature information;
  acquiring desk pressure of the target user; and
  supervising desk behavior of the target user based on the desk pressure of the target user and the specific pressure monitoring threshold.

Optionally, the user feature includes at least one of gender, age, height, and weight, and the predicting specific pressure monitoring thresholds associated with different desk states of the user based on the target user feature information includes:
   calculating limb mass data of the user based on the target user feature information; and
   predicting a first pressure monitoring threshold of the user in a desk sleeping state based on the limb mass data, where
   the supervising desk behavior of the target user based on the desk pressure of the target user and the specific pressure monitoring threshold includes:
   when the desk pressure of the target user is greater than or equal to the first pressure monitoring threshold, predicting that the target user is in the desk sleeping state, and generating a user wake-up instruction.

Optionally, the predicting specific pressure monitoring thresholds associated with different desk states of the user based on the target user feature information includes:
   calculating limb mass data of the user based on the target user feature information; and
   predicting a second pressure monitoring threshold of the user in a desk read-write state based on the limb mass data, where
   the supervising desk behavior of the target user based on the desk pressure of the target user and the specific pressure monitoring threshold includes:
   when the desk pressure of the target user is less than the first pressure monitoring threshold and greater than or equal to the second pressure monitoring threshold, predicting that the target user is in the desk read-write state, and generating a read-write state monitoring instruction.

Optionally, the method further includes:
   monitoring at least one of a read-write posture, a read-write duration, and an ambient light brightness of the user based on the read-write state monitoring instruction;
   when the read-write posture does meet a preset posture, generating a posture correction prompt; and/or
   when the continuous read-write duration is greater than a preset duration, generating a read-write duration prompt; and/or
   when the ambient light brightness is less than a preset brightness, generating a fatigue eye-using prompt.

Optionally, based on the read-write state monitoring instruction is executed by a classroom centralized imaging device or is executed by an independent imaging device at a target user position, and when the read-write state monitoring instruction is executed by the classroom centralized imaging device, the method further includes:
   recognizing a plurality of users in a classroom through a facial recognition technology; and
   matching a recognition result with an identifier of an independent pressure monitoring device and/or a message prompt device at a pre-stored user position, so as to complete user vision protection supervision based on the cooperation with the independent pressure monitoring device and/or the message prompt device at the corresponding user position.

Optionally, the method further includes:
   acquiring a grayscale image of a force application surface obtained during pressure monitoring;
   when a grayscale gradient of the grayscale image of the force application surface indicates that there is an edge grayscale change exceeding a preset value, determining that the grayscale image of the force application surface is a non-user force application point; and
   excluding pressure data corresponding to the non-user force application point.

Optionally, the method further includes:
   acquiring a grayscale image of a force application surface obtained during pressure monitoring;
   when the grayscale image of the force application surface is a uniform grayscale image, determining that the grayscale image of the force application surface is a non-user force application point; and
   excluding pressure data corresponding to the non-user force application point.

Figure 3:
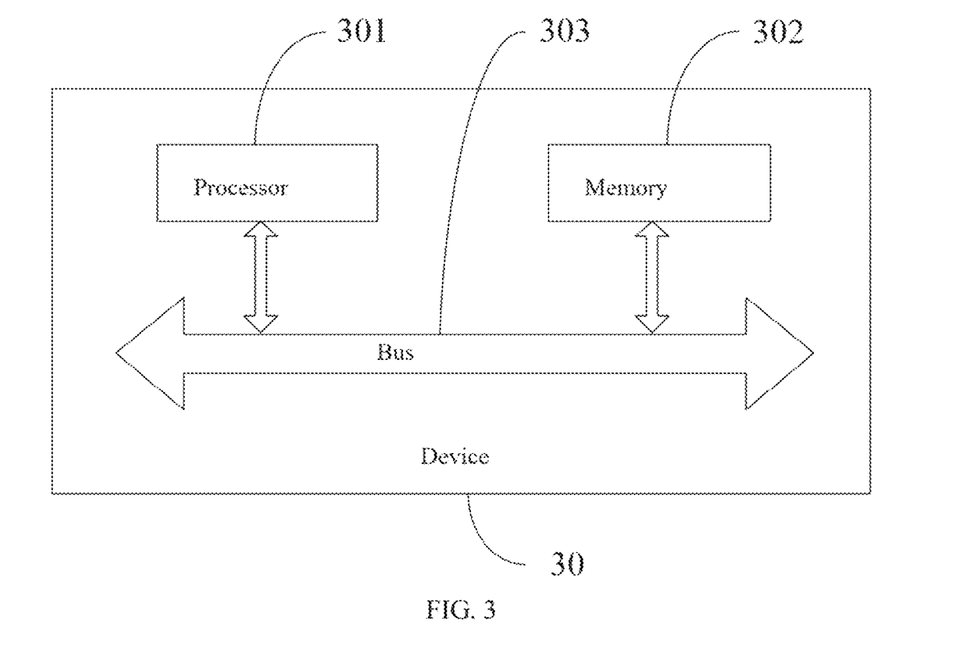
FIG. 3 is a schematic block diagram of constitution of a user vision protection supervision electronic device according to an embodiment of the present invention.

An embodiment of the present invention provides an electronic device 30. As shown in FIG. 3, the above electronic device includes at least one processor 301, at least one memory 302 connected to the processor, and a bus 303, where the processor 301 and the memory 302 communicate with each other through the bus 303; and the processor 301 is configured to invoke program instructions in the memory to perform the above user vision protection supervision method.

The intelligent electronic device herein can be a PC, a PAD, a mobile phone and the like.

This application further provides a computer program product, and when the computer program product is executed on the process management electronic device, the computer program product is suitable for executing a program initialized with the above steps of the user vision protection supervision method:

This application is described with reference to the flowcharts and/or block diagrams of the method, the electronic device (system), and the computer program product according to the embodiments of this application. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of another programmable process management electronic device to generate a machine, so that the instructions executed by the computer or the processor of the another programmable process management electronic device generate an apparatus for implementing a specified function in one or more processes in the flowcharts and/or in one or more blocks in the block diagrams.

In a typical configuration, the electronic device includes one or more processors (CPU), a memory, and a bus. The electronic device further includes an input/output interface, a network interface and the like.

The memory may include a form of a non-permanent memory such as a random access memory (RAM) and/or a non-volatile memory such as a read-only memory (ROM) or a flash memory (flash RAM) in computer-readable media, and the memory includes at least one storage chip. The memory is an example of the computer-readable medium.

The computer readable medium includes permanent and non-permanent, removable and non-removable media, and can store information using any method or technology. The information may be computer readable instructions, data structures, modules of programs, or other data. Examples of computer-readable storage medium of the computer include, but are not limited to, a phase-change memory (PRAM), a static random access memory (SRAM), a dynamic random access memory (DRAM), other types of random access memories (RAM), a read-only memory (ROM), an electrically erasable programmable read-only memory (EE- PROM), a flash memory or other memory technologies, a compact disc read-only memory (CD-ROM), a digital versatile disc (DVD) or other optical storage, a magnetic cassette, a magnetic tape, a magnetic disk storage or other magnetic storage electronic devices, or any other non-transmission media, which can be used to store information that can be accessed by a computing electronic device. As defined in this specification, the computer-readable medium does not include transitory computer-readable media (transitory media), such as a modulated data signal and carrier.

Moreover, the terms "comprise", "include" or any other variations thereof intend to cover non-exclusive inclusion, so that the procedure, method, commodity, or electronic device including a series of elements not only include those elements, but also include other elements that are not specifically listed, or also include inherent elements of this procedure, method, commodity, or electronic device. An element preceded by "includes a . . . " does not, without more constraints, preclude the existence of additional identical elements in the process, method, commodity, or electronic device that includes the element.

A person skilled in the art should understand that the embodiments of this application may be provided as a method, a system, or a computer program product. Therefore, this application may use a form of hardware only embodiments, software only embodiments, or embodiments with a combination of software and hardware. Moreover, in this application, a form of a computer program product that is implemented on one or more computer-usable computer-readable storage medium (including but not limited to a disk memory, a CD-ROM, an optical memory, and the like) that include computer usable program code.

The foregoing descriptions are only embodiments of this application, but this application is not limited to such embodiments. Persons skilled in the art understand that this application may have various modifications and variations. Any modification, equivalent replacement, and improvement made without departing from the spirit and principle of this application shall fall within the protection scope of the claims of this application.

What is claimed is:

1. A user vision protection supervision method, comprising:
    acquiring target user feature information, wherein the user feature comprises at least one of gender, age, height, and weight;
    calculating limb mass data of the user based on the target user feature information;
    predicting a first pressure monitoring threshold of the user in a desk sleeping state and a second pressure monitoring threshold of the user in a desk read-write state based on the limb mass data;
    acquiring desk pressure of the target user;
    determining a desk state of the user by comparing the desk pressure with the first and second pressure monitoring thresholds, wherein:
    when the desk pressure of the target user is greater than or equal to the first pressure monitoring threshold, generating a user wake-up instruction; and
    when the desk pressure of the target user is less than the first pressure monitoring threshold and greater than or equal to the second pressure monitoring threshold, generating a read-write state monitoring instruction;
    monitoring at least one of a read-write posture, a read-write duration, and an ambient light brightness of the user based on the read-write state monitoring instruction, wherein:
    when the read-write posture does meet a preset posture, generating a posture correction prompt; and/or
    when the continuous read-write duration is greater than a preset duration, generating a read-write duration prompt; and/or
    when the ambient light brightness is less than a preset brightness, generating a fatigue eye-using prompt and adjusting an ambient light source.

2. The method according to claim 1, wherein based on the read-write state monitoring instruction is executed by a classroom centralized imaging device or is executed by an independent imaging device at a target user position, and when the read-write state monitoring instruction is executed by the classroom centralized imaging device, the method further comprises:
    recognizing a plurality of users in a classroom through a facial recognition technology; and
    matching a recognition result with an identifier of an independent pressure monitoring device and/or a message prompt device at a pre-stored user position, so as to complete user vision protection supervision based on the cooperation with the independent pressure monitoring device and/or the message prompt device at the corresponding user position.

3. The method according to claim 1, further comprising:
    acquiring a grayscale image of a force application surface obtained during pressure monitoring;
    when a grayscale gradient of the grayscale image of the force application surface indicates that there is an edge grayscale change exceeding a preset value, determining that the grayscale image of the force application surface is a non-user force application point; and
    excluding pressure data corresponding to the non-user force application point.

4. The method according to claim 1, further comprising:
    acquiring a grayscale image of a force application surface obtained during pressure monitoring;
    when the grayscale image of the force application surface is a uniform grayscale image, determining that the grayscale image of the force application surface is a non-user force application point; and
    excluding pressure data corresponding to the non-user force application point.

5. A user vision protection supervision apparatus, comprising a sensor configured to acquire desk pressure of a target user, a processor and a memory storing program codes, wherein the processor performs the stored program codes for:
    acquiring target user feature information, wherein the user feature comprises at least one of gender, age, height, and weight;
    calculating limb mass data of the user based on the target user feature information;
    predicting a first pressure monitoring threshold of the user in a desk sleeping state and a second pressure monitoring threshold of the user in a desk read-write state based on the limb mass data;
    determining a desk state of the user by comparing the desk pressure with the first and second pressure monitoring thresholds, wherein:
    when the desk pressure of the target user is greater than or equal to the first pressure monitoring threshold, generating a user wake-up instruction; and
    when the desk pressure of the target user is less than the first pressure monitoring threshold and greater than or equal to the second pressure monitoring threshold, generating a read-write state monitoring instruction;

monitoring at least one of a read-write posture, a read-write duration, and an ambient light brightness of the user based on the read-write state monitoring instruction, wherein:

when the read-write posture does meet a preset posture, generating a posture correction prompt; and/or when the continuous read-write duration is greater than a preset duration, generating a read-write duration prompt; and/or when the ambient light brightness is less than a preset brightness, generating a fatigue eye-using prompt and adjusting an ambient light source.

\* \* \* \* \*